(12) United States Patent
Shiratori et al.

(10) Patent No.: US 6,853,299 B2
(45) Date of Patent: Feb. 8, 2005

(54) AUTOMATIC ALARM SYSTEM

(75) Inventors: Kazuhiro Shiratori, Kanagawa (JP);
Toshikazu Igarashi, Kanagawa (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 146 days.

(21) Appl. No.: 10/163,735

(22) Filed: Jun. 6, 2002

(65) Prior Publication Data

US 2003/0001737 A1 Jan. 2, 2003

(30) Foreign Application Priority Data

Jun. 18, 2001 (JP) .................................. 2001-183350

(51) Int. Cl.$^7$ ........................... G08B 29/00; G08B 23/00
(52) U.S. Cl. ........................ 340/506; 340/517; 340/531; 340/539.17
(58) Field of Search ............................... 340/506, 531, 340/539.17, 539.18, 517

(56) References Cited

U.S. PATENT DOCUMENTS 6,049,272 A * 4/2000 Lee et al. .............. 340/539.18
6,147,601 A * 11/2000 Sandelman et al. ......... 340/506
6,369,705 B1 * 4/2002 Kennedy .................... 340/506
6,696,956 B1 * 2/2004 Uchida et al. ........... 340/573.1

* cited by examiner

*Primary Examiner*—Donnie L. Crosland
(74) *Attorney, Agent, or Firm*—Reed Smith LLP; Stanley P. Fisher, Esq.; Juan Carlos A. Marquex, Esq.

(57) ABSTRACT

A monitor signal from monitoring equipment or from a monitoring tool is input to a alarm device. Alarm software comprises a contact state monitoring module which monitors a contact state of a contact input device, a command analyzing module which analyzes a command generated by the monitoring tool, an information obtaining module which obtains information required for command executions, a program executing module which executes a command, and a message output module which sends a message to a specified destination by using specified means, and alarms through a telephone line and an electronic mail system. The alarm software also includes user information, group information, alarm content information, schedule information, and contact information, as information required for the command executions. An easy-to-maintain alarm system is thus realized in the way which has a small influence on an existing environment.

16 Claims, 9 Drawing Sheets

FIG.2

User Information

| User Name | AAAA | BBBB | .. |
|---|---|---|---|
| Telephone Number | 090-XXXX-XXXX | 045-XXX-XXXX | .. |
| Pager Number | — | 03-XXXX-XXXX | .. |
| E-mail Address | aa@xx.xx.jp | bb@xx.xx.jp | .. |
| (Others) | .. | .. | .. |

FIG.3

Group Information

| | |
|---|---|
| Group ID: 1000 | Activate Revolving Light |
| | Telephone to AAAA |
| | Message to Pager of BBBB |
| | Electronic Mail to BBBB |
| Group ID: 2000 | Electronic Mail to AAAA |
| | Telephone to BBBB |
| ⋮ | ⋮ |

FIG.4

Alarm Content Information

| Group ID | Alarm Content | | | |
| --- | --- | --- | --- | --- |
| | Telephone | Pager | E-mail | (Others) |
| 1000 | Tel_file_A | — | mail_file_C | ... |
| 2000 | — | pb_file_A | mail_file_D | ... |
| 3000 | Tel_file_B | pb_file_B | mail_file_E | ... |
| ⋮ | ... | | | |

FIG.5

Schedule Information

| Hour Time Zone | Alarm Media | | | | |
| --- | --- | --- | --- | --- | --- |
| | Telephone | Pager | E-mail | Revolving Light | (Others) |
| 0 o'clock | × | ○ | ○ | ○ | ‥ |
| 1 o'clock | × | ○ | ○ | ○ | ‥ |
| 2 o'clock | × | ○ | ○ | ○ | ‥ |
| ⋮ | ⋮ | ⋮ | ⋮ | ⋮ | ⋮ |
| 20 o'clock | ○ | × | ○ | × | ‥ |
| 21 o'clock | ○ | ○ | ○ | × | ‥ |
| 22 o'clock | ○ | × | ○ | × | ‥ |
| ⋮ | ⋮ | ⋮ | ⋮ | ⋮ | ⋮ |

FIG.8

Execution Result/Record Information

| Date and Time | Operations |
|---|---|
| [2001/05/09 09:40:15] | Start Alarming to Group ID 1000 |
| [2001/05/09 09:42:18] | Complete Telephoning to User AAAA |
| [2001/05/09 09:44:19] | Fail in Paging to User BBBB |
| [2001/05/09 09:44:20] | Complete Electronic Mailing to User BBBB |
| [2001/05/09 09:40:21] | Complete Alarming to Group ID 1000 |

FIG.10

| Contact Number | Alarming Process Content |
|---|---|
| 1 | Alarm to Group ID: 1000 |
| 2 | Alarm to Group ID: 2000 |
| 3 | Alarm to Group ID: 3000 |
| .. | .. |

AUTOMATIC ALARM SYSTEM

FIELD OF THE INVENTION

The present invention relates to an automatic alarm system in which a computer automatically carries out alarm means when a failure or abnormality occurs.

BACKGROUND OF THE INVENTION

A conventional alarm system issues a warning when detecting an abnormality in a network or computer machine, or monitors a production line in a factory, and gives an alert and stops the production line when an abnormality occurs in the production line. In a monitoring operation, the conventional alarm system employs specific hardware and software which display a warning on a monitor or sound a buzzer or bell, as alarm methods, in order to alarm to an operator and maintenance person.

The alarm method previously employed in the conventional alarm system often fails to alarm to the operator and maintenance person. A reliable alarm is done by sending an alarm to their alarm media. Alarm methods therefore need to carefully change according to the operator and maintenance person. To add a new alarm method to an existing system, a complicated installation of the new method and even a reconstruction of the system should be considered. Even though the installation and reconstruction can be achieved, new requirements of the alarm system will generate according to time and circumstances. For example, when new alarm destinations of monitoring persons (alarm receivers) change due to personnel relocation, a consideration for another installation into the existing system is required, causing a heavy burden.

An object of the present invention is to easily construct a reliable alarm system. Another object of the present invention is to construct an easy to maintain, expandable, and flexible alarm system minimizes influence on an existing environment.

SUMMARY OF THE INVENTION

The above-described objects of the present invention are achieved by constructing a reliable and flexible automatic alarm system in which alarm functions are grouped independent of existing environments, and interface with various monitoring tools and monitoring software. The automatic alarm system of the present invention sends an alarm in response to a contact signal of an existing monitoring device, or by communicating with existing monitoring software.

The automatic alarm system according to one aspect of the present invention comprises: a destination information storing module which stores information on alarm destinations; a command analyzing module which analyzes a command executed by a monitoring program which monitors a state; an information obtaining module which obtains alarm destination information from the destination information storing module in reference to information involved in the command obtained by the command analyzing module; and a message output module which transmits a predetermined message to a destination specified in the destination information.

An automatic alarm system according to another aspect of the present invention comprises: a destination information storing module which stores information on alarm destinations; an alarm content information storing module which stores information on alarm contents; a command analyzing module which analyzes a command executed by a monitoring program which monitors a state; an information obtaining module which obtains the destination information from the destination information storing module in reference to information involved in the command obtained by the command analyzing module, and obtains the alarm content information from the alarm content information storing module; and a message output module which transmits a message specified in the alarm content information to a destination specified by the destination information.

An automatic alarm system according to another aspect of the present invention comprises: a destination information storing module which stores information on alarm destinations; a contact input device which is connected to an output contact of a monitoring device which monitors a state; a contact information storing module which links and records a contact state of the contact input device and information on process contents; a contact monitoring module which monitors the contact state of the contact input device and executes a command of a process content recorded in the contact information storing module when the contact is in a specific state; a command analyzing module which analyzes the command executed by the contact monitoring module; an information obtaining module which obtains alarm destination information from the destination information storing module in reference to information obtained by the command analyzing module; and a message output module which transmits a specific message to a destination specified in the destination information.

An automatic alarm system according to still another aspect of the present invention comprises: a destination information storing module which stores information on alarm destinations; an alarm content information storing module which stores information on alarm contents; a contact input device which is connected to an output contact of a monitoring device which monitors a state; a contact information storing module which links and records a contact state of the contact input device and information on alarm process contents; a contact monitoring module which monitors the contact state of the contact input device and executes a command of a process content recorded in the contact information storing module when the contact is in a specific state; a command analyzing module which analyzes the command executed by the contact monitoring module; an information obtaining module which obtains the alarm destination information from the destination information storing module in reference to information obtained by the command analyzing module and obtains the alarm content information from the alarm content information storing module; and a message output module which transmits a message specified in the alarm content information to a destination specified by the destination information.

The destination information storing module can store plural destinations divided into groups. The destination information storing module may further comprise schedule information storing means which stores the information on time zones during each of which message transmission is inhibited.

The message can be transmitted by telephone or electronic mail.

The automatic alarm system can be achieved by loading a program into its computer. The program can be loaded into the computer via recording media such as CD-ROMs, DVDs, MOs, and floppy disks, or via networks.

The present invention realizes an easy-to-modify, expandable automatic alarm system which exerts small influence on an existing environment, by grouping the alarm functions independent of the existing environment, and by adding the grouped functions to the existing environment. In addition, a quicker response to the occurrence of an abnormality becomes possible with the grouped alarm functions interfacing with various monitoring devices and monitoring tools.

When the present invention is applied to, for example, a system monitoring networks and computer machines, a maintenance person in the distance can receive an alarm on the occurrence of an abnormality, and thus reduce its own tasks, enabling a quick response to the abnormality. When the present invention is applied to a batch system at night, a maintenance person can be immediately receive an alarm on the occurrence of abnormal termination of a job, and thus the job can be re-executed earlier, minimizing influence on the operations on the next day. When the present invention is applied to a production plant, a maintenance person can receive an alarm on, for example, a fuel tank in which the remaining amount, to be monitored by a sensor, has dropped below a threshold level, and thus a monitoring operation by the maintenance person becomes unnecessary. Additionally, a maintenance person in a distant building can receive an alarm on a situation that the production line has stopped. In addition to the above-described example situations, the present invention is applicable to various situations which need to be alarmed to maintenance persons.

BRIEF DESCRIPTION OF THE DRAWINGS

FIG. 2 explains an example of user information.

FIG. 3 is an explanation drawing of one sample of group information.

FIG. 4 explains an example of alarm content information.

FIG. 5 explains an example of schedule information.

FIG. 8 shows an example of execution result/record information.

FIG. 10 shows contact numbers of a contact input device and alarm process contents.

DETAILED DESCRIPTION OF THE PREFERRED EMBODIMENTS

Figure 1:
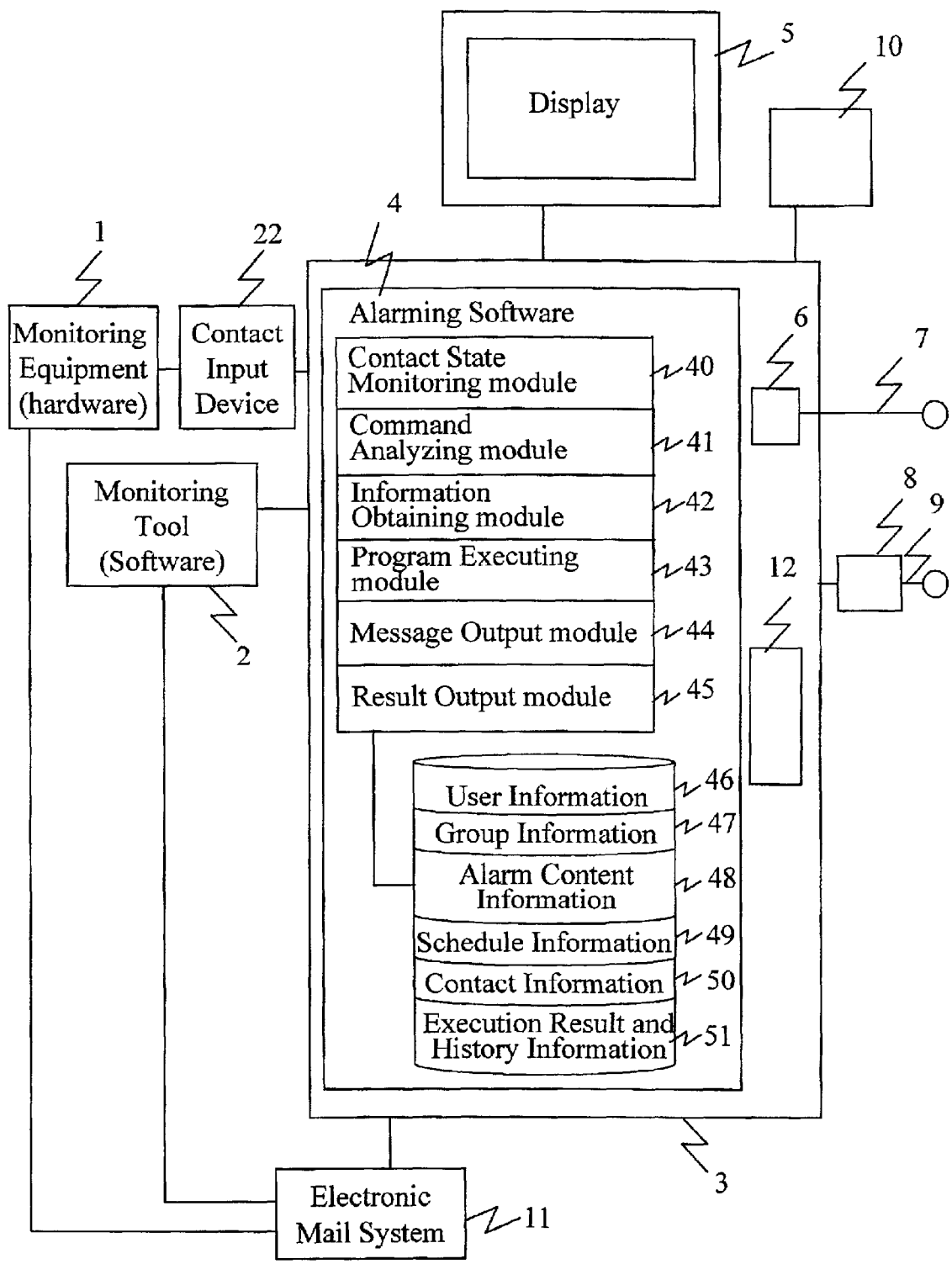
FIG. 1 is a block diagram showing an example of an automatic alarm system according to the present invention.

One embodiment of the present invention will be concretely described in the following with reference to the appended drawings. FIG. 1 is a block diagram, which explains one example of an automatic alarm system according to the present invention. An alarm device 3 (computer) receives detect signals from monitoring equipment 1 such as various types of detectors and sensors, and from a monitoring tool 2 (software). The outputs of the monitoring equipment 1 are input to the alarm device 3 via a contact input device 22. The computer of the alarm device 3 includes alarm software 4 and other programs 12, and connects to a display 5. The computer 3 is connected to a network 7 and telephone line 9 by a network connecting device 6 and modem 8. The computer 3 is also connected to an annunciation device 10 such as a revolving light, which is controlled by the alarm software 4. The computer 3 is further connected to a computer 11 of an electronic mail system, and thus the alarm software 4 transmits an electronic mail via the computer 11. The monitoring equipment 1 and monitoring tool 2 may independently transmit an electronic mail by connecting to the computer 11 of the electronic mail system. The electronic mail system can be contained in the computer 3 of the alarm device.

The alarm software 4 comprises a contact state monitoring module 40 which monitors states of contacts of the contact input device 22, a command analyzing module 41 which analyzes commands generated by the monitoring tool 2, an information obtaining module 42 which obtains information required for executing the commands, a program executing module 43 which executes the commands, a massage output module 44 which alarms to specified destinations by using specified means, and a result output module 45 which outputs the results and records of the alarm processes. In addition, the alarm software 4 includes user information 46, group information 47, alarm content information 48, schedule information 49, and contact information 50, as the information required for executing the commands, and includes execution result/record information 51 in which the results of the alarms are recorded.

The monitoring equipment 1 and monitoring tool 2 monitor a state of a system such as a network and computer machine, a manufacturing plant, and a production line. When the monitoring equipment 1 or monitoring tool 2 detects an abnormality of these monitored systems and generates an abnormal signal, the alarm software 4 in the alarm device 3 activates to carry out an alarm process according to the information which the alarm software 4 manages.

The output contacts of the monitoring equipment 1 are connected to the contact input device 22. An RS-232C interface connects the contact input device 22 and computer 3. When the monitoring equipment 1 detects an abnormality, the computer 3 receives the contact output of the monitoring equipment 1 via the contact input device 22 and RS-232C interface, and thereby the alarm software 4 executes an alarm command in such a manner as described below. The monitoring equipment 1 which employs, for example, a remaining amount sensor for a fuel tank, alerts warning, when the remaining amount of the fuel tank drops below a certain level. An alert signal (contact output) is input to the computer 3 via the contact input device 22, and thereby the alarm software 4 operating in the computer 3 executes the alarm command to transmit a necessary alarm.

The monitoring tool 2 may operate on a computer connecting to the computer 3 via a network, or on the computer 3 which contains the alarm software 4. In the monitoring tool 2, an executing command for an abnormal event is previously defined. An alarm command of the alarm software 4 is automatically executed as the defined executing command when an abnormal event occurs. For example, when the monitoring tool 2 employs a network monitoring software, a display content of a screen changes in response to the occurrence of the abnormal event. An alarm command is previously defined in the alarm software 4 as the automatic action when the display content changes. The alarm command is automatically executed when the display content changes.

The automatic alarm system of the present invention can interface with the existing monitoring systems 1 and 2 only by executing the command of the alarm software 4 in response to the detection of the abnormal event. With this command level interface for alarm, the automatic alarm system of the present invention can be easily constructed interfacing with an existing monitoring system which enables a command execution.

When a command of the alarm software 4 is executed, the command analyzing module 41 analyzes the command, and the argument and option thereof, and obtains the user information 46, group information 47, and schedule information 48 that are defined in the information obtaining module 42 based on the result of the analysis. Next, the program executing module 43 executes the analyzed command, and then the message output module 44 outputs (alarms) a message to an obtained destination. The result output module 45 outputs the result and record of the execution to a file.

As described above, because only a command execution is needed to alarm, an alarm system which exerts small influence on an existing environment can be constructed by adding a tool required for alarm, such as the alarm software 4, to the existing environment. There are two command execution procedures. One procedure is that the alarm software 4 receives a signal indicating the abnormal event detected by the monitoring equipment 1, and thereby automatically outputs a command. Another procedure is that, when the monitoring tool 2 detects the abnormal event, the alarm software 4 starts in response to a command execution. In both two procedures, an automatic command execution enables an immediate and reliable alarm.

Since the information 46, 47, 48, and 49 required for alarm are managed together by the alarm software 4, only the information of the alarm software 4 can be changed without changing the existing environments 1 and 2 even when a sudden operation alteration occurs. Therefore, the present invention can be easily used for changing persons to whom a message is alarmed, adding an alarm medium of a maintenance person, and limiting an alarm.

FIG. 2 is an explanation diagram of one example of the user information 46. The user information 46 includes information on users to whom the alarm software alarms and information on alarm means such as a telephone, pager, and electronic mail, and on their destinations such as a telephone number, pager number, and an electronic mail address of the users. In FIG. 2, a portable phone number and electronic mail address of a user "AAAA", and a portable phone number, pager number, and electronic mail address of a user "BBBB" are registered as the alarm means and destinations thereof.

FIG. 3 is an explanation diagram of one example of the group information 47. The group information 47 contains group IDs and plural destination information. In a group ID: 1000, an activation of the revolving light, telephone call to the user "AAAA", messaging to the pager of the user "BBBB", and sending of an electronic mail to the user "BBBB" are registered. In a group ID: 2000, a sending of an electronic mail to the user "AAAA" and telephone call to the user "BBBB" are registered.

FIG. 4 is an explanation diagram of one example of the alarm content information 48. In the alarm content information 48, the contents to be alarmed are classified according to the group IDs. The group ID: 1000 shows that content registered in Tel_file_A is to be alarmed with a telephone, and a content registered in mail_file_C is to be alarmed with an electronic mail. The group ID: 2000 shows that a content registered in pb_file_A is to be alarmed with a pager, and a content registered in mail_file_E is to be alarmed with an electronic mail.

FIG. 5 explains an example of the schedule information 49. In the schedule information 49, a permission period during which an alarm can be transmitted, and an inhibition period during which an alarm cannot be transmitted, are defined for each media. In FIG. 5, a circle mark expresses the permission period and a cross mark expresses the inhibition period. The schedule information of FIG. 5 is defined for a whole system. The schedule information can be also defined for each user or each group. In addition to the period, day and date information can be added to the schedule information.

A procedure that the automatic alarm system of the present invention alarms in response to a monitor signal from the monitoring tool (software) 2 will be described in the following.

Figure 6:
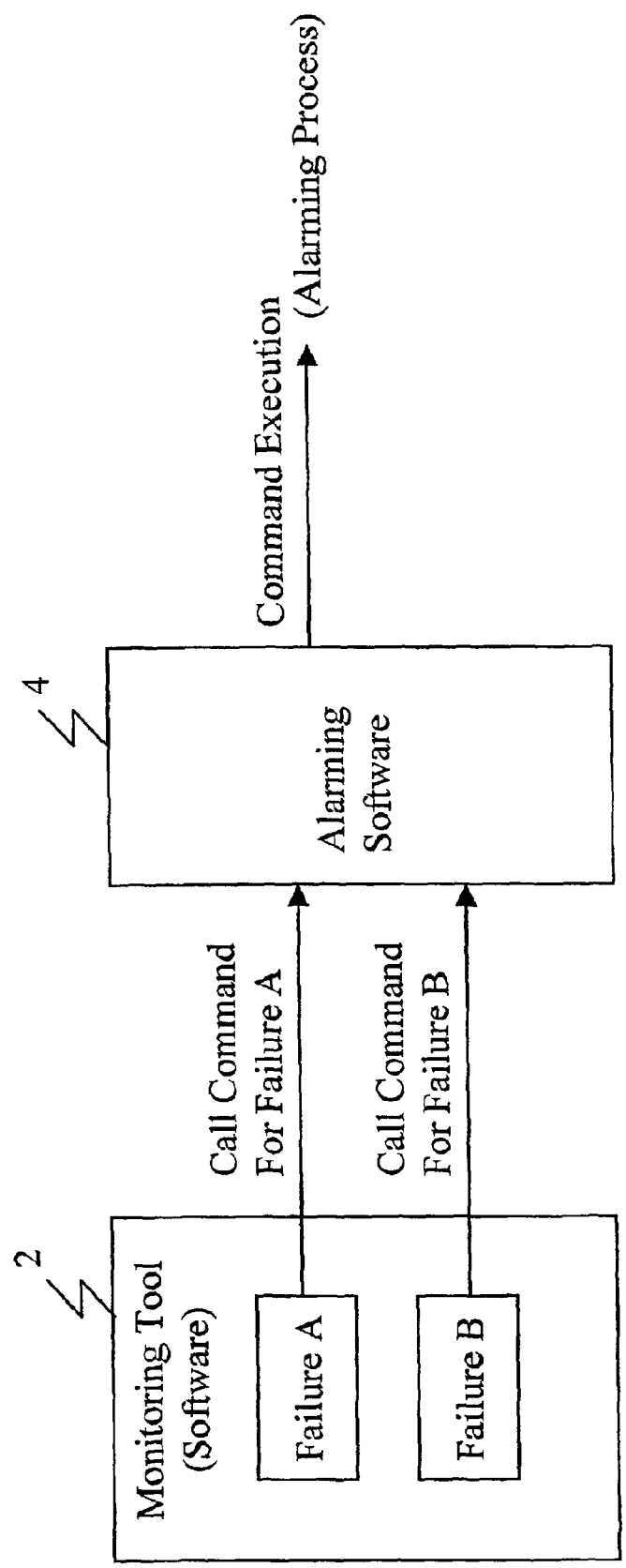
FIG. 6 is a block diagram which explains an interfacing between a monitoring tool (software) and the automatic alarm system according to the present invention.

FIG. 6 is a block diagram which explains an interfacing between the monitoring tool (software) and automatic alarm system of the present invention. In the monitoring tool 2, an alarm command provided by the alarm software 4 is defined as the automatic action when a failure is detected. A content of the alarm command to be executed can be changed according to failure types, in such a way that an alarm A is defined for a failure A, or an alarm B is defined for a failure B. For example, a "Cmd group ID" is defined as the command executed when the monitoring tool detects the failure A. When the failure A occurs, the command for the failure A is automatically executed, and thereby an alarm is transmitted to the destination group specified by the group ID. Likewise, an alarm for the failure B can be processed with the alarm command defined to be executed when the failure B occurs.

When the monitoring tool 2 and alarm software 4 are in the same computer, an alarm can be done by a standard command executing function of the computer without a particular interface between the monitoring tool 2 and alarm software 4. That is to say, when the monitoring tool 2 executes a command of the alarm software 4, the alarm software 4 activates to alarm. When the monitoring tool 2 and alarm software 4 are respectively in different computers, the monitoring tool 2 in one computer executes a command of another computer which contains the alarm software 4 by using, for example, the standard UNIX remote shell function.

Figure 7:
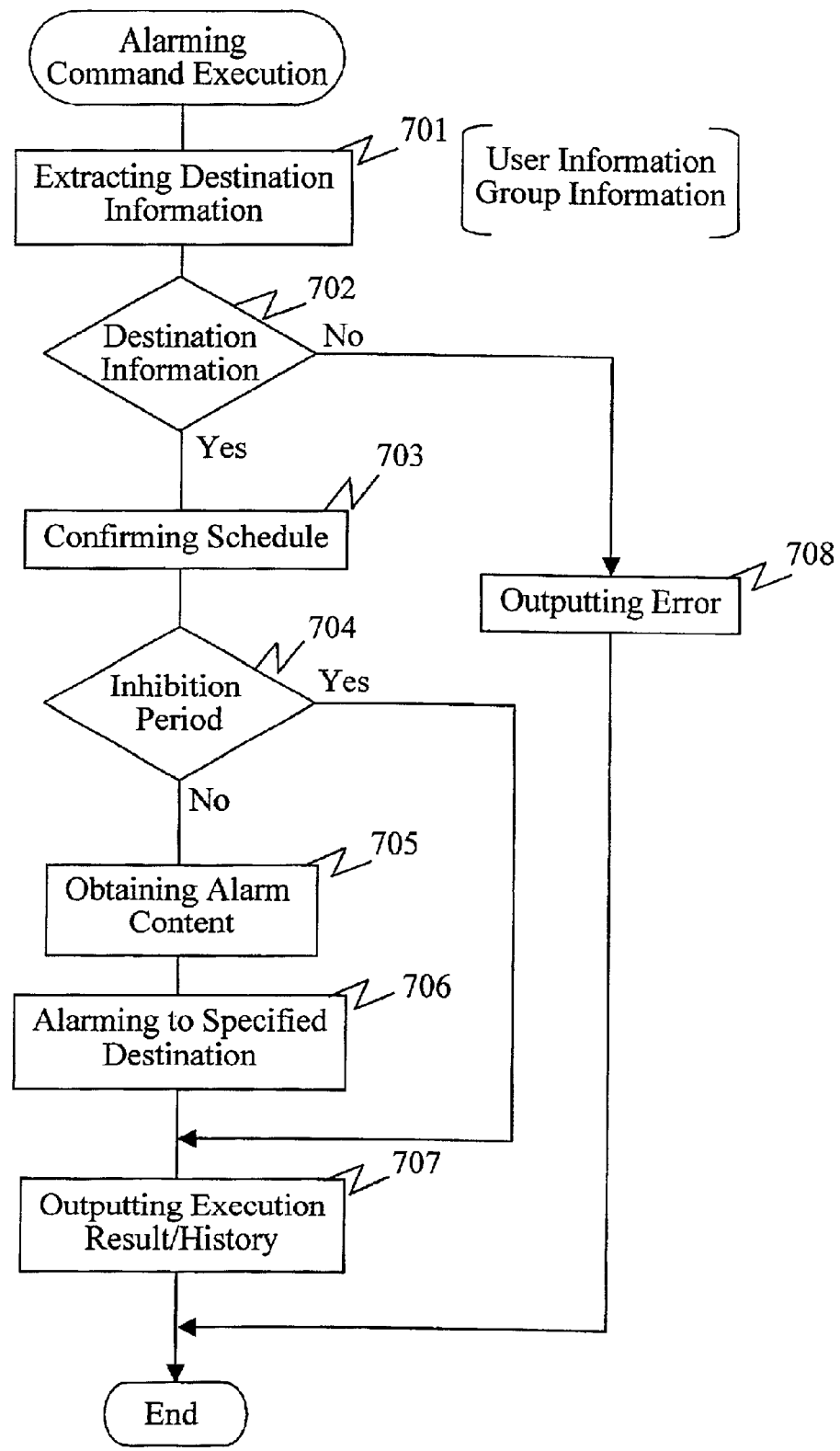
FIG. 7 is a flow chart of a process after an alarm command of alarm software is executed.

FIG. 7 is a flowchart that shows one example process after an alarm command of the alarm software 4 starts. When the command starts, the user information and group information which the alarm software 4 manages is extracted according to the information (arguments, options) when the command is activated (step 701).

For example, a command "Cmd 1000" is executed to alarm to the group ID: 1000 of FIG. 3. When the command "Cmd 1000" is executed, it is determined whether or not destination information exists in reference to the group information 47 and individual user information 46 forming the group information (step 702). When the destination information does not exist, an error message is output and then the command execution ends (step 708). In the group ID: 1000 of FIG. 3, the revolving light (electronic device) 10 is first activated, and an alarm is transmitted to in the following order: the telephone of the user AAAA, the pager of the user BBBB, the electronic mail of the user BBBB. The alarm to each destination is done in reference to the user information 46.

After checking the destination information, the alarm command sequentially refers to the schedule information 49 representing the schedule of each alarm media such as the revolving light and telephone (step 703), and checks whether or not the execution time of each alarm media is in the inhibition period (step 704). As shown in FIG. 5, when the current time (09:40:15) is out of the inhibition period between zero o'clock and two o'clock, the alarm content information 48 is obtained to be transmitted as a message (step 705). Tel__file__A, which is a content of an alarm to the telephone of the group ID: 1000 shown in FIG. 4, is sent to the above-described destination (step 706). Likewise, the messages are transmitted to the specified destinations by using a pager and electronic mail. Lastly, the results of such message transmissions are output to a file (step 707). FIG. 8 shows the output contents representing the dates and times and operations of the executions. The destinations, dates and times, and success or failure of the alarm process can be recorded.

An alarm procedure by the alarm system of the present invention in response to monitor signals from the monitoring equipment (hardware) 1 will be described in the following.

Figure 9:
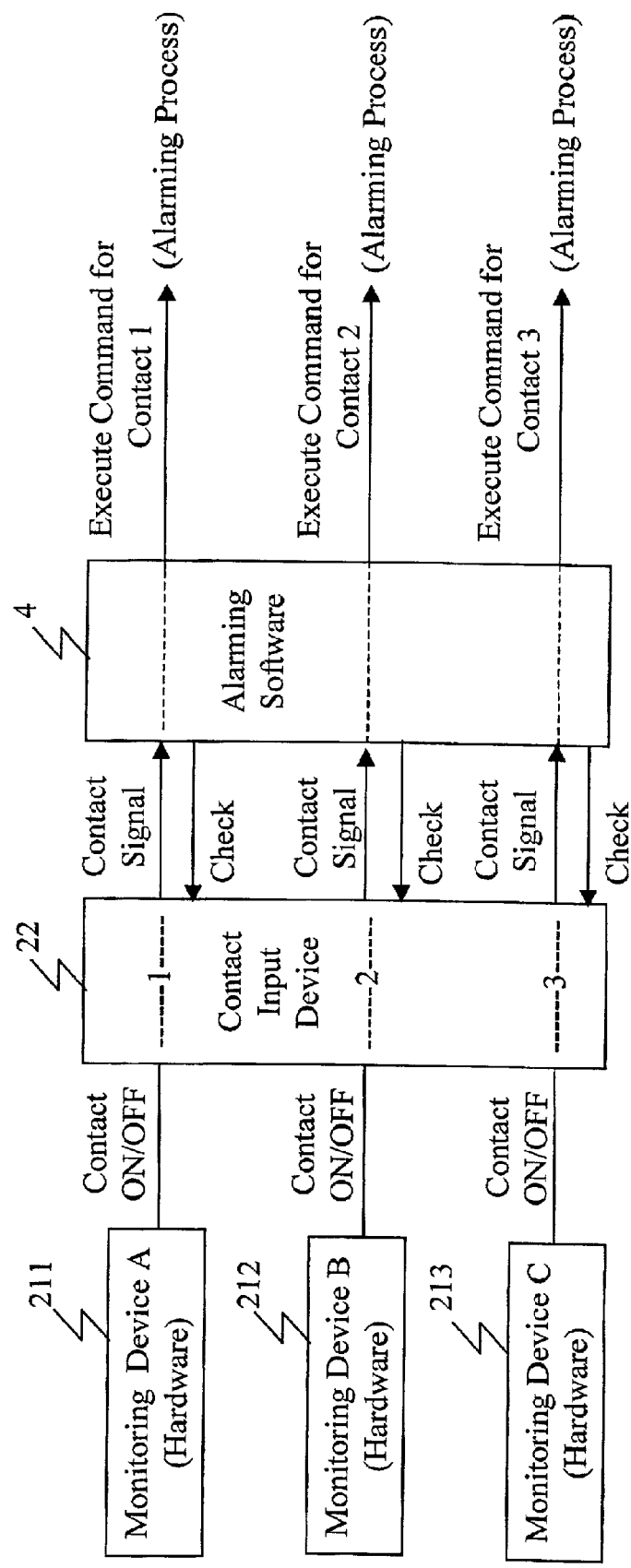
FIG. 9 is a block diagram which explains an interfacing between the monitoring device and the automatic alarm system of the present invention.

FIG. 9 is a block diagram which explains an interfacing between monitoring devices and the alarm system of the present invention. The monitoring devices 211, 212, and 213, which are respectively provided for various monitorings, are connected to the alarm system. Each monitoring device closes a contact (turns on) when it detects an abnormality of a monitored object. The output contacts of the monitoring devices 211, 212, and 213 are connected to the contacts of the contact input device 22, respectively. The contacts of the contact input device 22 are numbered from 1 to 3. For example, the monitoring device 211 connects to the contact 1, the monitoring device 212 connects to the contact 2, and the monitoring device 213 connects to the contact 3. The contact input device 22 is connected to the computer 3 in which the alarm software 4 operates. A contact state monitoring module 40 of the monitoring software 4 periodically checks states of the contact input device 22, and previously defines an alarm content for a state of each contact.

FIG. 10 shows an example of definition for the contact numbers of the contact input device 22 and for the contents of the alarm processes. This information of the FIG. 10 is previously defined to indicate how the alarm software 4 operates when each contact of the contact input device 22 closes, and is stored in the contact information 50 of the alarm software 4 in FIG. 1.

When the monitoring device 211 detects an abnormality, the contact of the monitoring device 211 closes (turns on), and simultaneously the contact 1 of the contact input device 22 closes. The alarm software 4 detects such a state that the contact 1 of the contact input device 22 has turned on, and thereby an alarm process is done according to the alarm definition (in FIG. 10, alarm to the group ID: 1000) for the contact 1. Likewise, when the monitoring device 212 detects an abnormality, an alarm process is done according to the alarm definition for the contact 2, and when the monitoring device 213 detects an abnormality, an alarm process is done according to the alarm definition for the contact 3. As described above, these respective monitoring devices are connected to the different contacts of the contact input device 22, and are provided with different alarm contents previously defined by the alarm software 4, to carry out different alarm processes.

Figure 11:
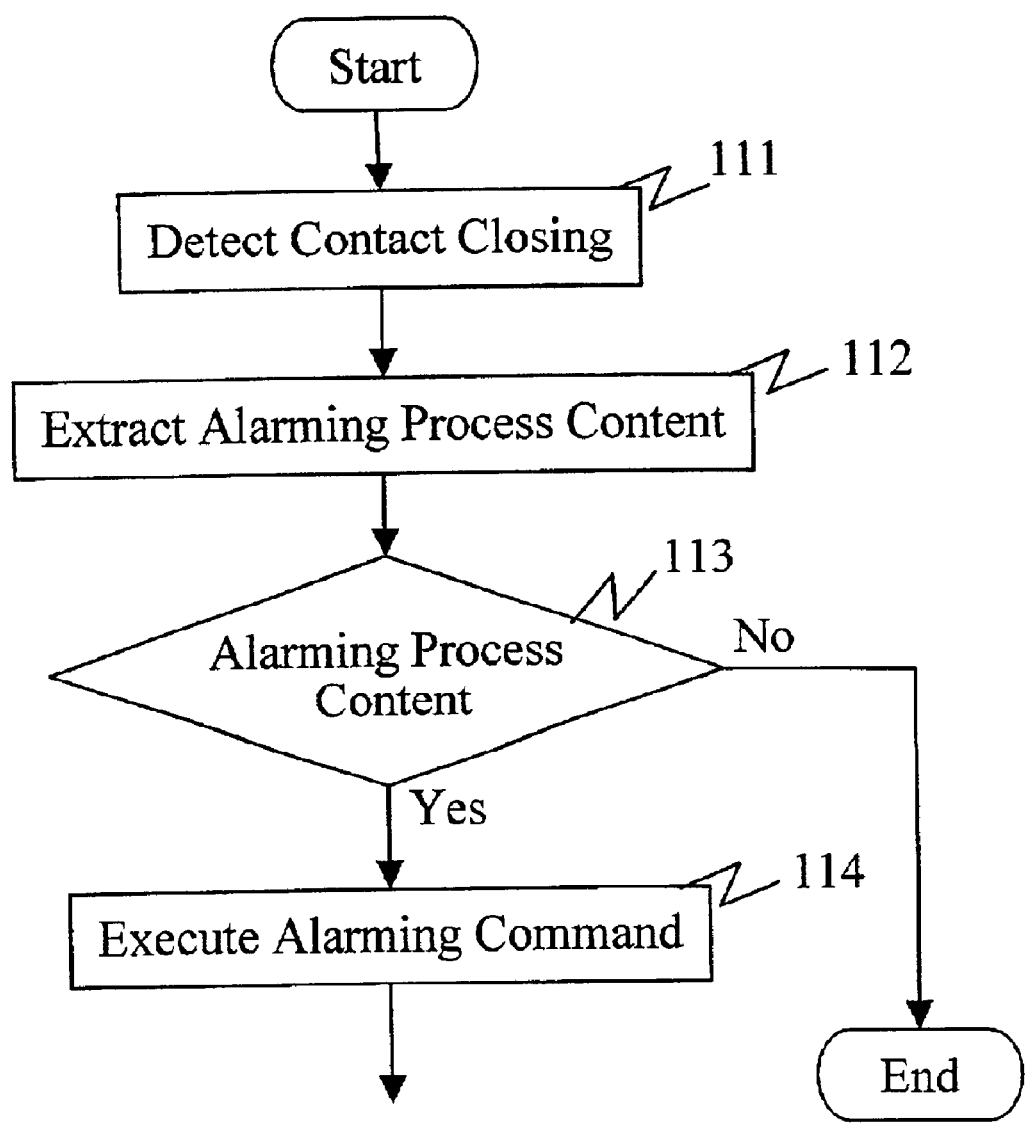
FIG. 11 is a flowchart which shows a procedure of the alarm process according to a contact signal from the monitoring device.

FIG. 11 is a flow chart which shows a procedure of an alarm process according to a contact signal from the monitoring device.

When a state that one of contacts of the contact input device 22 has closed is detected (step 111), an alarm process for the closed contact is checked using the definition information shown FIG. 10 (step 112), and it is determined whether or not to alarm (step 113). When the alarm process has not been defined (a content of an alarm process does not exist), the alarm process finishes without any execution. When the alarm process has been defined (a content of the alarm process exists), an alarm command relevant to the alarm process is executed (step 114), and then the same process as from the step 701 downwards is done, as shown in FIG. 7.

The flow of the process towards the alarm command execution has been described above. The automatic alarm system of the present invention can be altered only by changing the contents of respective information items 46 to 50 managed by the alarm software 4. To be more precise, the user information 46 in FIG. 2, the group information 47 in FIG. 3, the alarm content information 48 in FIG. 4, the schedule information 49 in FIG. 5, and the contact information 50 in FIG. 10 are changed. For example, when the name of the user 1 changes from "AAAA" to "CCCC" because of a personnel relocation, "AAAA" in FIG. 2 is replaced with "CCCC", and the destination of "AAAA" is also replaced with that of "CCCC". When there is an alteration to a work time of the user BBBB, the schedule information in FIG. 5 is changed. When an alarm content of the electronic mail in the group ID: 1000 needs to be altered, the file name "mail__file__C" in the alarm content information in FIG. 4 is replaced with another file name, or the whole content of "mail__file__C" is changed. As described above, since the automatic alarm system added to an existing environment stands alone, the alteration to the information on the alarms can be achieved by altering only the automatic alarm system, minimizing influence on the existing environment.

According to the first invention, an automatic alarm system can be added to an existing environment, and exert small influence on the existing environment.

According to the second and third invention, an alarm command is executed in response to a contact signal from a monitoring device, or as an automatic action, so that the automatic alarm system can interface with various monitoring systems.

According to the forth invention, alarm contents are managed together, so that destinations can be easily altered, alarm media can be easily selected, and a sudden operation alteration can be flexibly dealt with.

According to the fifth invention, alarm functions stand alone, so that an automatic alarm system with superior maintainability can be constructed.

What is claimed is:

1. An automatic alarm system comprising:
   a destination information storing module which stores information on destinations to which an abnormality of a monitored object is reported;
   a contact input device which is connected to an output contact of a monitoring device which monitors a state of the monitored object and sets the output contact in a predetermined state when an abnormality of the monitored object is detected;
   a contact information storing module which links and records a contact state of the contact input device and information on process contents;
   a contact monitoring module which monitors the contact state of the contact input device, and detects the predetermined state of the output contact of the monitoring device;

a command analyzing module which analyzes a command corresponding to the detected predetermined state of the output contact of the monitoring device;

schedule information storing module which stores schedule information on a time zone for each of the destinations stored in the destination information storing module during which message-transmission is inhibited;

an information obtaining module which obtains alarm destination information from the destination information storing module in reference to the command obtained by the command analyzing module; and a message output module which transmits an alarm message to a destination specified in the alarm destination information in accordance with the schedule information when message-transmission is not inhibited.

2. The automatic alarm system according to claim 1, wherein plural alarm destinations are divided into groups and stored in the destination information storing module.

3. The automatic alarm system according to claim 1, wherein the message is transmitted by telephone or electronic mail.

4. An automatic alarm system comprising:

a destination information storing module which stores information on destinations to which an abnormality of a monitored object is reported;

an alarm content information storing module which stores information on alarm contents;

a contact input device which is connected to an output contact of a monitoring device which monitors a state of the monitored object and sets the output contact in a predetermined state when an abnormality of the monitored object is detected;

a contact information storing module which links and records the contact state of the contact input device and the information on process contents;

a contact monitoring module which monitors the contact state of the contact input device, and detects the predetermined state of the output contact of the monitoring device;

a command analyzing module which analyzes a command corresponding to the detected predetermined state of the output contact of the monitoring device;

schedule information storing module which stores schedule information on a time zone for each of the destinations stored in the destination information storing module during which message-transmission is inhibited;

an information obtaining module which obtains alarm destination information from the destination information storing module in reference to the command obtained by the command analyzing module; and a message output module which transmits an alarm message to a destination specified in the alarm destination information, in accordance with the schedule information when message-transmission is not inhibited.

5. The automatic alarm system according to claim 4, wherein plural alarm destinations are divided into groups and stored in the destination information storing module.

6. The automatic alarm system according to claim 4, wherein the message is transmitted by telephone or electronic mail.

7. A computer readable medium having a computer program which makes a computer execute an automatic alarm system, the automatic alarm system comprising:

a destination information storing module which stores information on destinations to which an abnormality of a monitored object is reported;

a command analyzing module which analyzes a command executed by a monitoring program which automatically monitors a state of the monitored object and detects an abnormality of the monitored object;

schedule information storing module which stores schedule information on a time zone for each of the destinations stored in the destination information storing module during which message-transmission is inhibited;

an information obtaining module which obtains alarm destination information from the destination information storing module in reference to the command obtained by the command analyzing module; and a message output module which transmits an alarm message to a destination specified in the alarm destination information in accordance with the schedule information when message-transmission is not inhibited.

8. The program according to claim 7, wherein plural alarm destinations are divided into groups and stored in the destination information storing module.

9. The program according to claim 7, wherein the message is transmitted by telephone or electronic mail.

10. A computer readable medium having a computer program which makes a computer execute an automatic alarm system, the automatic alarm system comprising:

a destination information storing module which stores information on destinations to which an abnormality of a monitored object is reported;

an alarm content information storing module which stores information on alarm contents;

a command analyzing module which analyzes a command executed by a monitoring program which automatically monitors a state of the monitored object and detects an abnormality of the monitored object;

schedule information storing module which stores schedule information on a time zone for each of the destinations stored in the destination information storing during which message-transmission is inhibited;

an information obtaining module which obtains alarm destination information from the destination information storing module in reference to the command obtained by the command analyzing module; and a message output module which transmits an alarm message to a destination specified in the alarm destination information in accordance with the schedule information when message-transmission is not inhibited.

11. The program according to claim 10, wherein plural alarm destinations are divided into groups and stored in the destination information storing module.

12. The program according to claim 10, wherein the message is transmitted by telephone or electronic mail.

13. An automatic alarm system comprising:

a destination information storing module which stores information on destinations of a plurality of monitoring devices for at least one user to whom an abnormality of a respective monitored object is reported;

a contact input device which is connected to an output contact of each monitoring device which monitors a state of the monitored object and sets the output contact in a predetermined state when an abnormality of the monitored object is detected;

a contact information storing module which links and records an output contact state of each monitoring device;

an alarm processing information storing module which stores alarm processing contents regarding said user to be reported and the monitoring devices in association with each alarm processing content;

an alarm content information storing module which stores the alarm content made by each monitoring device for each alarm processing content;

a contact state monitoring module which monitors the state of the output contact of each monitoring device in order to detect a predetermined state of the output contact of any of the monitoring devices, said predetermined state being stored in the contact information storing module;

a command analyzing module which analyzes the alarm processing contents of a monitoring device upon detection of an abnormality that corresponds to the detected predetermined state of the output contact of the monitoring device;

schedule information storing module which stores schedule information on a time zone for each of the destinations stored in the destination information storing module during which message-transmission is inhibited;

an information obtaining module which obtains alarm destination information from the destination information storing modulo in reference to the alarm processing contents obtained by the command analyzing module, and which obtains the alarm content from the alarm content information storing module; and a message output module which transmits an alarm message containing the alarm content specified in each alarm processing content to a destination specified in the alarm destination information in accordance with the schedule information when message-transmission is not inhibited.

14. The automatic alarm system according to claim 13, wherein the schedule information storing module is provided in association with each user.

15. An automatic alarm system comprising:

a destination information storing module which stores information on destinations of a plurality of monitoring devices for automatically detecting an abnormality of a respective monitored object to be reported to at least one user;

an alarm command module to which an abnormality alarm command transmitted from said monitoring devices;

an alarm processing information storing module which stores alarm processing contents regarding one or a plurality of users to be reported and the monitoring devices in association with each abnormality alarm command;

an alarm content information storing module which stores the alarm content made by each monitoring device for each alarm processing content;

a command analyzing module which analyzes the alarm processing contents of a monitoring device upon detection of an abnormality that corresponds to the abnormality alarm command transmitted to the alarm command input module;

schedule information storing module which stores schedule information on a time zone for each of the destinations stored in the destination information storing module during which message-transmission is inhibited;

an information obtaining module which obtains alarm destination information from the destination information storing modulo in reference to the alarm processing contents obtained by the command analyzing module, and which obtains the alarm content from the alarm content information storing module; and a message output module which transmits an alarm message containing the alarm content specified in each alarm processing content to a destination specified in the alarm destination information in accordance with the schedule information when message-transmission is not inhibited.

16. The automatic alarm system according to claim 15, wherein the schedule information storing module is provided in association with each user.

* * * * *